United States Patent Office 3,793,362
Patented Feb. 19, 1974

3,793,362
REDUCTION OF ACIDIC IMPURITIES IN POLY-METHYLENE POLYPHENYLISOCYANATES
Richard A. Kolakowski, North Brandford, and Alexander McLaughlin, Meriden, Conn., assignors to The Upjohn Company, Kalamazoo, Mich.
No Drawing. Filed Oct. 18, 1971, Ser. No. 190,379
Int. Cl. C07c *119/04*
U.S. Cl. 260—453 SP    9 Claims

ABSTRACT OF THE DISCLOSURE

A process is disclosed, for reducing acidity and hydrolyzable chloride levels in polymethylene polyphenylisocyanates. The process comprises treating the polymeric isocyanate with from 0.25 to 1.0 epoxy equivalents of a monomeric epoxide compound for each equivalent of acid present in the isocyanate. The process is particularly advantageous in that reduction of acid and hydrolyzable chloride levels is obtained without appreciable increases in polymer viscosity. Polymethylene polyphenylisocyanates treated by the process of the invention show improved reactivity rates in the preparation of polyurethane and polyisocyanurate foams, and result in forms of improved structure.

BACKGROUND OF THE INVENTION

(1) Field of the invention

This invention relates to polymeric organic isocyanates, and more particularly to a novel process for removing hydrolyzable chloride and reducing acidity in polymethylene polyphenylisocyanates.

(2) Description of the prior art

The majority of commercially available organic isocyanates are prepared by processes which comprise phosgenation of an amine compound. The isocyanate products obtained by phosgenation methods are generally contaminated with hydrogen chloride and a wide variety of by-products containing hydrolyzable chloride atoms; the latter being susceptible to conversion to free hydrogen chloride. Significant concentrations of such contaminants result in product acidity and adversely affect reactivity rates of the isocyanate.

Innumerable methods have been described for reducing acidity and/or hydrolyzable chloride concentrations in organic isocyanates. For example, a number of methods have been described which comprise treatment of the isocyanate with metals such as copper, silver, nickel, iron, zinc, cobalt, aluminum, bismuth, and the like; halide salts of such metals; and organic complexes of such metals, see for example U.S. Pats. 3,155,699; 3,264,336; 3,373,182 and 3,458,558. Following treatment in accord with such methods, it is often necessary to effect a separation of the isocyanate from the reaction by-products of the treatment, i.e.: metal salts and complexes. This is accomplished by distillation of the treatment product.

Fractional distillation of isocyanates has been described as a method for removing undesired acid contaminants from isocyanates (U.S. Pat. 3,264,336).

Recrystallization of diisocyanates is suggested for reducing hydrolyzable chloride levels in such compounds by British Pat. 1,229,181.

Reduction of hydrolyzable chloride (without a reduction of acidity) in isocyanates by a method of chloride hydrolysis is described in U.S. Pat. 3,179,680 and in Canadian Pat. 727,137. The acidity can be reduced concurrently by volatilization of hydrogen chloride present, using conventional methods, for example by passing a stream of inert gas through the isocyanate mixture while heating to a temperature circa 150° C. to 220° C. (see U.S. Pat. 3,516,950).

In all of the above described methods, the isocyanate is exposed to substantially high temperature ranges for extended periods of time, either during the process of treatment or during post-process separative steps necessitated by the treatment.

Polymethylene polyphenylisocyanates as a class are sensitive to heat, and any substantial heating of the polyisocyanate reults in polymerization and consequent viscosity build-ups. Also, when heating is carried out in the presence of a number of metals and metallic salts such as, for example, the iron, copper and tin materials employed in the above described methods of U.S. Pats. 3,155,699; 3,264,366; 3,373,182 and 3,458,558, polymerization rates are increased. Polymerization of the polyisocyanate with consequent viscosity build-ups is sometimes undesirable, limiting the uses for which the polyisocyanate can be employed.

It has been suggested that acid levels in crude polyarylpolyisocyanate compositions could be lowered by the addition of lime to the isocyanate. In theory, this could be accomplished without heating the isocyanate. However, lime is not readily soluble in polymethylene polyphenylisocyanates, and the technical problems in effecting a dispersion of finely micronized particles which will not interfere with subsequent uses of the isocyanate are complex and difficult to overcome.

We have now found that both the acidity and the hydrolyzable chloride content of polymethylene polyphenylisocyanates can be reduced in a single step with negligible increase in product viscosity. The polymethylene polyphenylisocyanate products of the process can be used to prepare polyurethane and polyisocyanurate foams without any further separative or treatment procedures. By our process, the isocyanate is treated with an epoxide compound.

Epoxide compounds have been employed in reaction processes as acid acceptors (see for example U.S. Pat. 3,448,046). They have not been suggested as suitable compounds for treating an isocyanate to reduce acidity and hydrolyzable chloride levels.

SUMMARY OF THE INVENTION

The invention comprises a process for reducing the acid content and the hydrolyzable chlorine content of a polymethylene polyphenylisocyanate which comprises mixing the polymethylene polyphenylisocyanate with from about 0.25 to about 1.0 epoxy equivalents of a monomeric epoxide compound, for such equivalent of acid present in the polymethylene polyphenylisocyanate.

The term "acid" refers to free hydrogen chlorine and strongly ionic, covalent bonded chloride present in the isocyanate. The value or concentration of such "acid" is determined by heating the isocyanate in a solution of toluene and methanol, and titrating the resulting mixture with dilute potassium hydroxide. From the quantity of potassium hydroxide required to neutralize the acidity of the mixture, the percent of "acid" is determined. The method of determining the concentration of acid is described in greater detail hereinafter. The value of the acid concentration determined by this method is sometimes referred to in the art as a "hot acid" value.

The term "hydrolyzable chloride" refers to labile chloride atoms which are covalently bonded within a compound, but having more ionic character than, for example, the chlorine atom present in chlobenzene. The hydrolyzable chloride value is determined by extracting the chloride from the isocyanate contaminants by hydrolysis in an aqueous-methanol-caustic solvent media and titration of the resulting chloride ion concentration with silver nitrate. Details of the method for determining hydrolyzable chloride values are described more fully hereinafter.

The term "epoxy equivalent" as used in the specification and claims means that weight of epoxide compound which contains an average of one epoxy group. The term "epoxy group" as used herein means the moiety of formula:

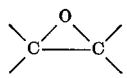

Polymethylene polyphenylisocyanates treated by the process of the invention are mixtures containing from about 35 to about 85 percent by weight of methylenebis (phenylisocyanate), the remainder of the mixture being comprised of closely related polyisocyanates of higher molecular weight and functionality. They are well known compositions, and are commercially prepared by phosgenation of mixtures of the corresponding methylene-bridged polyphenyl polyamides. The latter, in turn, are obtained by interaction of formaldehyde, hydrochloric acid and primary aromatic amines such as aniline, o-chloroaniline, o-toluidine, and the like using procedures well known in the art. Illustrative of known methods for preparing methylene-bridged polyphenyl polyamines and polymethylene polyphenylisocyanates therefrom are those described in U.S. Pats. 2,683,730; 2,950,263; 3,012,008; 3,344,162 and 3,362,979; Canadian Pat. 700,-026 and German specification 1,131,877. Included in the polymethylene polyphenylisocyanates treated by the process of the invention are those which have been heat treated to increase their viscosity. For convenience, polymethylene polyphenyl isocyanates will be referred to hereinafter, alternatively, as "polyisocyanates."

Polyisocyanates having relatively low acidity are highly desired for preparing polyurethane and polyisocyanurate foams; see for example U.S. Pats. 3,155,699 and 3,516,-950. By the process of our invention, acid concentrations in polymethylene polyphenylisocyanates are reduced by up to about 70 percent, as measured by the test method hereinafter described.

DETAILED DESCRIPTION OF THE INVENTION

The process of the invention is carried out by admixing the monomeric epoxide and the polymethylene polyphenylisocyanate together, using any conventional and appropriate equipment for mixing a liquid. Thus, mixing of the two materials can be carried out with any conventional blending equipment. When small quantities of polyisocyanate are to be treated, mixing is readily carried out by hand methods. When treating large quantities of polyisocyanate, it is advantageous to employ any of the powered blending devices commonly employed in preparing homogeneous blends of two fluid materials.

A thorough and uniform blending of the epoxide compound into the polyisocyanate is desirable. This is assured by a vigorous stirring of the polyisocyanate while gradually adding the epoxide compounds, and continuing agitation of the mixture for from 15 to 30 minutes after addition is complete.

Blending of the epoxide compound into the polyisocyanate is assisted by heating the polyisocyanate to lower its viscosity. For this purpose, the polyisocyanate can be pre-heated, or heated during admixture with the epoxide, within a range of from about 68° F. to about 300° F. Preferably, the mixture of epoxide and polyisocyanate is not exposed to temperatures exceeding about 200° F. and most preferably not in excess of about 150° F.

As previously stated, the polymethylene polyphenylisocyanates tend to increase in viscosity when exposed to that for extended periods of time. When heat is employed in the process of the invention, there is only negligible viscosity build-up if cooling to ambient temperatures occurs within about 2 to 3 hours of completing the epoxide addition.

Isocyanates, in general, are susceptible to reaction with moisture. For this reason, most mixing operations of isocyanates are preferably carried out in a dry atmosphere and preferably under an inert gas atmosphere, such as nitrogen gas. The techniques are well known, and are advantageously employed in the process of the present invention.

The epoxide compound is employed advantageously in a proportion of from about 0.25 to about 1.0 epoxy equivalents for each equivalent of acid present in the polyisocyanate. Preferably, the proportion is within the range of from about 0.5 to 1.0 epoxy equivalents per equivalent of acid, and most preferably from about 0.7 to about 1.0 epoxy equivalents per equivalent of acid.

Within about 15 minutes after admixture of the epoxide and the polyisocyanate, a substantial reduction in acidity is observable. The maximum reduction of acidity occurs within about 24 hours of addition, and the polymethylene polyphenylpolyisocyanate can then be employed, without any further treatment, for any purpose for which polyisocyanates are normally employed.

The epoxide compounds employed in the process of the invention can be any of the known monomeric epoxide compounds. They can be mono-, di- or polyepoxides and can be aliphatic, cycloaliphatic, aromatic or heterocyclic in nature and can be unsubstituted or substituted provided the substituent is not a group reactive with isocyanates.

Preferably, the monomeric epoxide compound is characterized by having at least one epoxy group present in a substituent attached to a hydrocarbon; or by having two terminal epoxy groups separated by the residue of a polyoxyalkylene glycol having a molecular weight of from about 100 to 700. Most preferably, the epoxide compound is characterized by having at least one epoxy group fused to a cycloaliphatic hydrocarbon ring.

Preferably, the monomeric epoxide compound employed is a mono or diepoxide.

The term "hydrocarbon" is used herein in its generally accepted sense as embracing aliphatic, cycloaliphatic and aromatic hydrocarbons. Illustrative of aliphatic hydrocarbons are those of 1 to 12 carbon atoms, inclusive, such as methane, ethane, propane, butane, pentane, hexane, heptane, octane, nonane, decane, undecane, dodecane and isomeric forms thereof. Illustrative of cycloaliphatic hydrocarbons are those of 6 to 12 carbon atoms, inclusive, such as cyclohexane, cycloheptane, cyclooctane, dicyclohexane, and the like. Illustrative of aromatic hydrocarbons are those having 6 to 12 carbon atoms, inclusive, such as benzene, naphthalene, biphenyl and the like.

Examples of monomeric epoxides having at least one epoxy group present in a substituent attached to a hydrocarbon are:

(1) The glycidyl ethers of aliphatic monohydroxy alcohols having 2 to 6 carbon atoms, inclusive such as ethanol, propanol, butanol, pentanol, hexanol, and isomeric forms thereof;

(2) Diglycidyl ethers of aliphatic diols having 2 to 6 carbon atoms, inclusive such as ethane-diol, propanediol, butanediol, pentanediol, hexanediol and isomeric forms thereof;

(3) Glycidyl ethers of monohydroxy aromatic compounds such as phenol naphthol, xylol and the like;

(4) The glycidyl ethers of polyhydric mononuclear and fused ring phenols such as resorcinol, hydroquinone, pyrocatechol, saligenin, phloroglucinol, 1,5-dihydroxy-naphthalene, 1,6-dihydroxynaphthalene, 1,7-dihydroxy-naphthalene and the like;

(5) The glycidyl ethers of non-fused polynuclear phenols represented by the general formula:

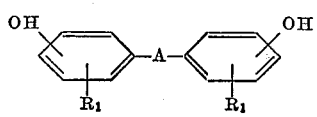

(a)

wherein $R_1$ represents from 0 to 4 substituents selected from the class consisting of halogen such as chlorine and bromine, and lower-alkyl, A is a bridging group selected from the class consisting of

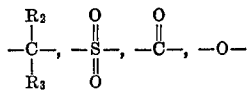

and a single covalent bond, wherein $R_2$ and $R_3$ each represent a moiety selected from the class consisting of hydrogen, lower-alkyl, lower-cycloalkyl and aryl. Illustrative of such compounds are the bis(glycidyl ethers) of:

4,4'-dihydroxydiphenylsulfone,
4,4'-dihydroxybiphenyl,
4,4'-dihydroxybenzophenone,
di(4-hydroxyphenyl)methane(bisphenol F),
2,2-di(4-hydroxyphenyl)butane (bisphenol B),
2,2-di(4-hydroxyphenyl)propane (bisphenol A),
1,1-di(4-hydroxyphenyl)propane,
3,3-di(3-hydroxyphenyl)pentane,
2-(3-hydroxphenyl)-2-(4'-hydroxyphenyl)butane,
1-phenyl-1-(2-hydroxyphenyl)-1-(3'-hydroxyphenyl)butane,
1-phenyl-1-(2-hydroxyphenyl)-1-(3'-hydroxyphenyl)propane,
1-phenyl-1,1-di(4-hydroxyphenyl)butane,
1-phenyl-1,1-di(4-hydroxyphenyl)pentane,
1-tolyl-1,1-di(4-hydroxyphenyl)ethane,
bis(3-bromo-4-hydroxyphenyl)methane,
2,2-bis(3-bromo-4-hydroxyphenyl)propane,
bis(3-bromo-4-hydroxyphenyl)diphenylmethane,
1,1-bis(3-bromo-4-hydroxyphenyl)-1-(2,5-dibromophenyl)ethane,
bis(3,5-bromo-4-hydroxyphenyl)methane,
2,2-bis(3,5-dibromo-4-hydroxyphenyl)propane,
bis(3,5-dibromo-4-hydroxyphenyl)diphenylmethane,
1,1-bis(3,5-dibromo-4-hydroxyphenyl)-1-(2,5-dibromophenyl)-ethane,
bis(3-bromo-4-hydroxyphenyl)sulfone and
bis(3,5-dibromo-4-hydroxyphenyl)sulfone;

(6) The glycidyl ethers of novolak resins. The novolak resins are the products obtained by acid condensation of phenol, or a substituted phenol, with formaldehyde and are conventionally represented by the general formula:

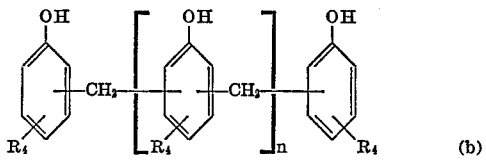

wherein $n$ has an average value of from about 8 to 12 and $R_4$ represents from 0 to 4 substituents selected from halogen and lower alkyl groups. It is to be understood that the above formula is highly idealized and is an approximation only; see, for example, Carswell, "phenoplasts," pp. 29–35, Interscience, New York, 1947. A wide range of novolak resins of differing molecular weights is available commercially, all of which are represented approximately by the above formula. Since the class of novolak resins is so well recognized in the art, the epoxides derived therefrom by conversion of the novolaks to their glycidyl ethers (by conventional procedures, e.g., reaction with epichlorohydrin) will be referred to hereafter as "novolak resin glycidyl ethers."

Monomeric epoxide compounds characterized by having two terminal epoxy groups separated by the residue of a polyoxyalkylene glycol having a molecular weight of from about 100 to about 700 are well known. They are illustrated by diepoxides of the formula:

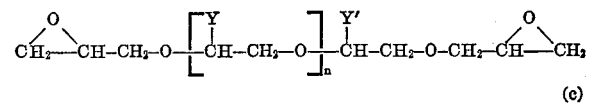

wherein Y and Y' are each selected from the group consisting of hydrogen and methyl and $n$ is an integer of from 1 to 10, inclusive. Representative of such diepoxides are those prepared by reaction of two moles of epichlorohydrin with one mole of a polyoxyalkylene glycol having a molecular weight of from about 100 to about 700. Polyoxyalkylene glycols are well known compounds as illustrated by polyoxyethylene glycol and polyoxypropylene glycol.

The most preferred epoxide compounds employed in the process of the invention are those wherein at least one epoxy group is fused to a cycloaliphatic hydrocarbon ring. Examples of such epoxides are: dicyclopentadiene dioxide; i.e. the compound having the formula:

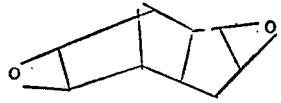

vinyl cyclohexene dioxide, i.e. the compound of formula:

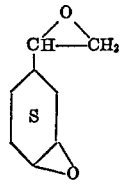

2-(3,4-epoxycyclohexyl - 5 - spiro-(3,4-epoxy)cyclohexane-m-dioxane; i.e. the compound having the formula:

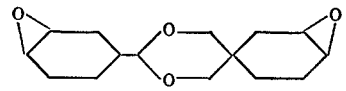

The dicyclohexyl oxide carboxylates represented by the general formula:

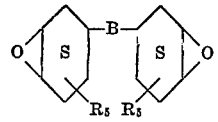

wherein $R_5$ in each instance represents from 0 to 3 lower-alkyl groups, and B represents a divalent radical selected from the class consisting of:

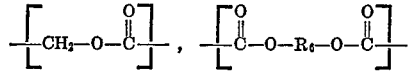

and

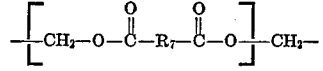

wherein $R_6$ is selected from the class consisting of lower alkylene and lower-oxyalkylene and $R_7$ is selected from the class consisting of lower-alkylene and arylene. Examples of the dicyclohexyl oxide carboxylates are:

3,4-epoxycyclohexylmethyl 3,4-epoxycyclohexanecarboxylate,
3,4-epoxy-6-methylcyclohexylmethyl 3,4-epoxy-6-methylcyclohexylcarboxylate,
bis(3,4-epoxycyclohexylmethyl)maleate,
bis(3,4-epoxycyclohexylmethyl)succinate,
ethylene glycol bis(3,4-epoxycyclohexanecarboxylate),
2-ethyl-1,3-hexanediol bis(3,4-epoxy-6-methylcyclohexanecarboxylate)

and the like.

The term "lower alkyl" is used throughout this specification and claims as meaning alkyl containing from 1 to 6 carbon atoms such as methyl, ethyl, propyl, butyl, pentyl, hexyl and isomeric forms thereof. The term "lower-alkylene" means alkylene containing from 1 to 6 carbon atoms such as methylene, ethylene, 1,3-propylene, 1,4-butylene, 2,3-butylene, 1,6-hexylene and the like. The term "lower-cycloalkyl" means cycloalkyl from 4 to 8 carbon atoms such as cyclobutyl, cyclopentyl, cyclohexyl, cycloheptyl and cyclooctyl. The term "lower-oxyalkylene" means lower alkylene as defined above, interrupted by the radical —O—. The term "arylene" means a bivalent radical, such as phenylene, tolylene, xylylene, biphenylylene and the like, derived from an aromatic hydrocarbon by removal of a hydrogen atom from each of two carbon atoms of the nucleus. The term "aryl" means the moiety obtained by removing one hydrogen atom from an aromatic hydrogen of from 6 to 12 carbon atoms, inclusive. Illustrative of aryl moieties are phenyl, tolyl, xylyl, biphenylyl, naphthyl and the like.

The monomeric epoxides described and examplified hereinabove are, for the most part, well known in the art; see for example, Lee and Neville, "Epoxy Resins," McGraw-Hill Book Company, New York (1957), U.S. Pats. 2,633,458, 2,716,123; 2,745,847; 2,745,285; 2,872,-427; 2,902,518; 2,884,408; 3,268,619; 3,325,452 and British Pat. 614,235.

The following examples describe the manner and process of making and using the invention and set forth the best mode contemplated by the inventors of carrying out the invention but are not to be construed as limiting. The various data relating to acid levels and hydrolyzable chloride content were obtained as follows:

Acidity determination

Two grams of the isocyanate to be analyzed is mixed with 75 ml. each of toluene and methanol in a 250 ml. Griffin beaker. The beaker is covered with a watch glass and the mixture refluxed for 5 minutes with stirring. The mixture is then allowed to cool to room temperature. Employing a Fisher Accumet pH meter with combination electrode, the mixture is titrated at a constant rate with 0.02 N potassium hydroxide in methanol to a pH of 7.7. A standard blank is prepared by carrying a mixture of 75 ml. each of toluene and methanol through the same procedure outlined above. The acid content of the isocyanate is then calculated according to the equation:

$$\text{Percent acid} = (A-B) \times 0.0365$$

wherein A is the number of milliters of potassium hydroxide solution used to titrate the isocyanate mixture and B is the number of milliliters of potassium hydroxide used to titrate the standard blank.

The number of equivalents of acid present in a given polyisocyanate are determined by the formula:

$$\text{Equivalents acid} = \frac{(\text{Percent acid})(\text{grams isocyanate to be treated})}{36.5}$$

Hydrolyzable chloride determination

Two grams of the isocyanate to be analyzed is dissolved in 20 ml. of dry toluene. To the solution, there is added 50 ml. of methanol and the mixture is refluxed for 5 minutes while stirring. There is then added 100 ml. of a solution of sodium hydroxide, water and methanol (2, 49, 49; weight/volume/volume, respectively). The resulting mixture is refluxed for 10 minutes while stirring and then allowed to cool to room temperature. With stirring there is then added 2.0 ml. of glacial acetic acid and 20 ml. of concentrated nitric acid, followed by 50 ml. of acetone. The resulting mixture is then stirred for 1 minute and titrated with a Fisher Accumet Ph meter with combination electrode, to minus 100 mvs., with 0.05 N silver nitrate solution. The percent hydrolyzable chloride is calculated according to the equation:

$$\text{Percent hydro. Cl} = (\text{ml. of silver nitrate used} - (0.08875)$$

EXAMPLE 1

A suitable reacton vessel fitted with a means for stirring is charged with 134 gms. of a mixture of polymethylene polyphenylisocyanates containing about 50 percent by weight of methylenebis(phenylisocyanate) and the balance being triisocyanates and polymers of higher molecular weight (PAPI®, The Upjohn Company, Kalamazoo Mich.), and having an Isocyanate Equivalent number of 134.2, a viscosity of 320 centipoises (at 25° C.), an acidity of 0.18 percent (0.00661 equivalent of hydrogen chloride) and a hydrolyzable chloride content of 0.74 percent. While stirring the isocyanate under a blanket of nitrogen gas, 0.743 gm. (0.00559 epoxy equivalents; 0.85 epoxy equivalents per equivalent of acid) of 3,4-epoxycyclohexylmethyl - 3,4 - epoxycyclohexanecarboxylate (ERL–4221, Union Carbide Corp. New York, N.Y.) is added. Upon completion of the addition, mixing is continued for about 30 minutes and the resulting mixture is allowed to stand for about 24 hours while maintaining the nitrogen gas atmosphere. The mixture obtained is a polymethylene polyphenylisocyanate composition having an Isocyanate Equivalent No. of 136, a viscosity of 340 centipoises at 25° C., acidity of 0.06 percent (a 66.5 percent reduction) and a hydrolyzable chloride content of 0.65 percent (a 12.1 percent reduction).

Examples 2 through 6 are conducted in accordance with the following procedure:

In an appropriate vessel, a proportion of a mixture of polymethylene polyphenylisocyanates containing about 50 percent by weight of methylene-bis(phenylisocyanate) (PAPI®, supra) is heated to 150° F. under a blanket of nitrogen gas. While maintaining the nitrogen gas atmosphere, varied proportions of 3,4-epoxycyclohexylmethyl-3,4 - epoxycyclohexane carboxylate (ERL–4221, supra) are added to the polyisocyanate with continuous stirring. The stirring is continued for about 30 minutes after the completion of addition, and the mixture is then allowed to cool to room temperature. The mixture is then allowed to stand under a nitrogen gas atmosphere for about 24 hours. The product obtained is a polymethylene polyphenyl isocyanate composition having reduced acidity and hydrolyzable chloride contents. The treatment conditions and characteristics of the products obtained are set forth in Table I below.

TABLE I

| Example No. | Wt. of polyisocyanate treated | Epoxy equivalents added per equivalent of acid present in polyisocyanate | Pre-treatment polyisocyanate physical properties ||||| Post-treatment polyisocyanate physical properties ||||
|---|---|---|---|---|---|---|---|---|---|---|
| | | | Isocyanate equivalent number | Viscosity (cps./25° C.) | Percent acid content | Percent hydrolyzable chloride content | Isocyanate equivalent number | Viscosity (cps./25° C.) | Percent acid content | Percent hydrolyzable chloride content |
| 2 | 134 grams | 0.25 | 132.0 | 420 | 0.19 | 0.68 | 134.5 | 430 | 0.15 | 0.67 |
| 3 | do | 0.5 | 132.0 | 420 | 0.19 | 0.68 | 134.5 | 460 | 0.15 | 0.66 |
| 4 | 277.38 pounds | 0.8 | 131.5 | 215 | 0.16 | 0.67 | 134.5 | 256 | 0.06 | 0.60 |
| 5 | 134 grams | 0.9 | | 300 | 0.17 | 0.68 | | 336 | 0.06 | 0.61 |
| 6 | do | 1.0 | | 300 | 0.17 | 0.68 | | 348 | 0.05 | 0.61 |

NOTE.—Comparison of results shown in Table I:

| Example number | 2 | 3 | 4 | 5 | 6 |
|---|---|---|---|---|---|
| Reduction of acidity, percent | 21.0 | 21.0 | 62.5 | 64.5 | 70.5 |
| Reduction of hydrolyzable chloride, percent | 1.4 | 2.9 | 10.4 | 10.3 | 10.3 |

EXAMPLE 7

This example is not an example of the invention but serves as a control. A portion of the untreated polymethylene polyphenyl isocyanate employed in Examples 5 and 6 above and having a viscosity of 300 cps. at 25° C., an acid content of 0.17 percent and a hydrolyzable chloride content of 0.68 percent is treated according to the procedure of Examples 2 through 6, except that no epoxide is added. The polymethylene polyphenyl isocyanate composition obtained has a viscosity of 300 centipoises/25° C., an acid content of 0.16 percent (a 5.9 percent reduction) and a hydrolyzable chloride content of 0.69 percent (a 1.4 percent increase).

Examples 8 through 10 are conducted according to the procedure of Examples 2 through 6 except that the 3,4-epoxycyclohexylmethyl-3,4-epoxycyclohexane carboxylate as used therein is replaced with 1 epoxy equivalent per equivalent of acid present in the untreated polyisocyanate, of each of the following epoxide compounds: phenyl glycidyl ether, resorcinol diglycidyl ether, and a diepoxide reaction product of two moles of epichlorohydrin with one mole of a polyoxypropylene glycol, said diepoxide having an epoxy equivalent weight of 332 (D.E.R. 732, The Dow Chemical Co., Midland Mich.). The polymethylene polyphenyl isocyanate employed in Examples 8 through 10 is characterized before treatment as having a viscosity of 230 centipoises, an acid content of 0.24 percent and a hydrolyzable chloride content of 0.86 percent. The results of treatment are set forth in Table II below.

mers of higher molecular weight [prepared by heating polymethylene polphenylisocyanate, containing about 50 percent by weight of methylenebis(phenyl isocyanate) having a viscosity, at 25° C., of about 250 centipoises, at about 235° C. until the viscosity (at 25° C.) is about 970 centipoises]. The polyisoyanate charge as an Isocyanate Equivalent Number of 142 and an acid content of 0.1 percent (5.87 equivalents of acid). The polyisocyanate charge is heated under a blanket of nitrogen gas to a temperature of 100° F. and 503.7 gms. (3.78 epoxy equivalent; 0.6 epoxy equivalents per equivalent of acid) of 3,4-epoxycyclohexylmethyl - 3,4 - epoxycyclohexanecarboxylate (ERL–4221, supra) is added thereto with stirring. Upon completion of the addition, stirring is continued for about 30 minutes and the mixture allowed to cool to ambient temperatures. The polymethylene polyphenyl isocyanate composition obtained has an Isocyanate Equivalent Number 141, a viscosity of 1000 centipoises and an acid content of 0.05 percent (a 50 percent reduction).

EXAMPLE 13

A kettle fitted with means for stirring is charged with 134 gms. of polymethylene polyphenylisocyanate containing about 65 percent by weight of methylenebis(phenylisocyanate), the remainder being triisocyanates and polymers of higher molecular weight (PAPI–901, The Upjohn Company, Kalamazoo, Mich.) and having a viscosity of about 72 centipoises (at 25° C.), an Isocyanate Equivalent Number of 134, and an acid content of 0.13 percent (0.00477 equivalent of acid). The polyiso-

TABLE II

| Example | Epoxide employed in treatment | Post-treatment polyisocyanate physical properties | | | | |
|---|---|---|---|---|---|---|
| | | Viscosity (cps./25° C.) | Percent acid content | Percent hydrolyzable chloride content | Percent acid reduction | Percent hydrolyzable chloride reduction |
| 8 | Phenyl glycidyl ether | 280 | 0.12 | 0.81 | 50 | 5.9 |
| 9 | Resorcinol diglycidyl ether [1] | 296 | 0.12 | 0.80 | 50 | 7.0 |
| 10 | D.E.R. 732 [2] | 304 | 0.12 | 0.80 | 50 | 7.0 |

[1] ERE-1359, Ciba Products Co. Summit, N.J.
[2] A diepoxide reaction product of two moles of epichlorohydrin with one mole of a polyoxypropylene glycol, and having an equivalent weight of 332, Dow Chemical Co., supra.

EXAMPLE 11

To 134 gms. of a mixture of polymethylene polyphenyl isocyanates containing 50 percent by weight of methylenebis(phenyl isocyanate) (PAPI®, supra) and having a viscosty of 230 centipoises (at 25° C.), an acid content of 0.24 percent (0.00881 equivalents of acid) and a hydrolyzable chloride content of 0.86 percent, previously heated to 150° F., there is added with stirring 1.0 gm. (0.0057 epoxy equivalents; 0.65 epoxy equivalents per equivalent of acid) of a polyepoxy which is a novolak resin glycidyl ether having an average functionality of 2.2 and an epoxide equivalent weight of from 172 to 179 (D.E.N. 431, Dow Chemical Co., Midland, Mich., see Bulletin No. 170–143A). Stirring is continued for about 30 minutes after addition is completed and the resulting mixture is allowed to stand for about 24 hours at ambient temperatures. The entire procedure described above is carried out while maintaining the isocyanate under a nitrogen gas atmosphere. The product is a polymethylene polyphenylisocyanate composition having a viscosity of 340 centipoises at 25° C., an acid content of 0.14 percent (a 41.6 percent reduction) and a hydrolyzable chloride content of 0.88 percent (2.3 percent reduction).

EXAMPLE 12

A kettle fitted with means for stirring is charged with 442.5 lbs. of polymethylene polyphenylisocyanate containing about 45 percent by weight of methylenebis (phenyl isocyanate), the remainder being triisocyanates and polycyanate charge is heated to 150° F. under a blanket of nitrogen gas. With stirring, 0.86 gm. (0.00478 epoxy equivalents; 1 epoxy equivalent per equivalent of acid) of phenyl glycidyl ether is then added to the polyisocyanate and the resulting mixture is maintained at a temperature of 150° F. for about 3 hours. At the end of this period, the mixture is cooled to ambient temperatures. The polyisocyanate composition obtained has an Isocyanate Equivalent Number of 136 and an acid content of 0.04 percent (a 68.3 percent reduction).

What is claimed is:

1. A process for reducing the acid content and the hydrolyzable chloride content of a polymethylene polyphenylisocyanate mixture containing from about 35 percent by weight to about 85 percent by weight of methylenebis(phenyl isocyanate) and the balance being triisocyanates and polymers of higher isocyanate functionality, which comprises mixing the polymethylene polyphenylisocyanate with from about 0.25 to about 1.0 epoxy equivalents of a monomeric compound containing at least one epoxide group and being free from other substituents reactive with isocyanate groups, for each equivalent of acid present in the polymethylene polphenylisocyanate said monomeric compound being selected from the class consisting of (a) the glycidyl ethers of aliphatic monohydroxy alcohols of 2 to 6 carbon atoms, inclusive, aliphatic diols of 2 to 6 carbon atoms, inclusive, polyoxyalkylene glycols of molecular weight from about 100 to about 700, monohydric phenols, polyhydric mononuclear and fused ring phenols, novolak resins and non-fused polynuclear phenols of the formula:

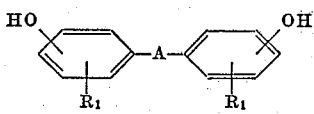

wherein $R_1$ represents from 0 to 4 substituents selected from the class consisting of halogen and lower-alkyl and A is a bridging member selected from the class consisting of

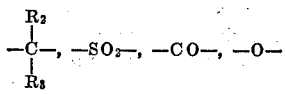

and a single covalent bond and wherein $R_2$ and $R_3$ are each selected from the class consisting of hydrogen, lower-alkyl, lower-cyclo-alkyl and aryl from 6 to 12 carbon atoms, inclusive;
(b) dicyclopentadiene dioxide,
(c) vinyl cyclohexene dioxide,
(d) 2-(3,4-epoxycyclohexyl)-5-spiro-(3,4-epoxy)cyclohexane-m-dioxane; and
(e) dicyclohexyl oxide carboxylates having the formula:

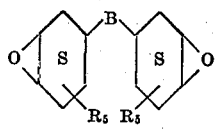

wherein $R_5$ in each instance represents from 0 to 3 lower-alkyl groups, and B represents a divalent radical selected from the class consisting of:

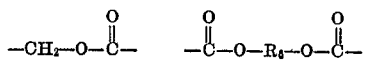

and

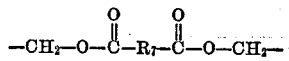

wherein $R_6$ is selected from the class consisting of lower-alkylene and lower-oxyalkylene and $R_7$ is selected from the class consisting of lower-alkylene and arylene from 6 to 12 carbon atoms, inclusive.

2. A process according to claim 1 wherein mixing is carried out at a temperature of from about 68° F. to about 200° F.

3. The process of claim 1 wherein said epoxide is employed in a proportion of from about 0.5 to about 1.0 epoxy equivalents for each equivalent of acid present in the polymethylene polyphenylisocyanate.

4. A process according to claim 1 wherein said epoxide compound has at least one epoxy group fused to a cycloaliphatic hydrocarbon ring.

5. A process according to claim 4 wherein said epoxide compound is 3,4-epoxycyclohexylmethyl-3,4 - epoxycyclohexane carboxylate.

6. A process according to claim 1 wherein said epoxide compound is phenyl glycidyl ether.

7. A process according to claim 1 wherein said epoxide compound is resorcinol diglycidyl ether.

8. A process according to claim 1 wherein said epoxide compound is the reaction product of 2 molar proportions of epichlorohydrin and 1 molar proportion of a polyoxyalkylene glycol having a molecular weight of from about 100 to about 700.

9. A process according to claim 1 wherein said epoxide compound is a novolak resin glycidyl ether.

References Cited
UNITED STATES PATENTS
3,294,713   12/1966   Hudson et al. _____ 260—453 X
2,885,420   5/1959    Spiegler _____ 260—453

LEWIS GOTTS, Primary Examiner
D. H. TORRENCE, Assistant Examiner

U.S. Cl. X.R.
260—2.5 AT, 2.5 AW, 453 AM